Patented Dec. 17, 1935

2,024,972

UNITED STATES PATENT OFFICE 2,024,972

MANUFACTURE OF CONDENSATION PRODUCTS

Leon Lilienfeld, Vienna, Austria

No Drawing. Application August 12, 1931, Serial No. 556,718. In Austria September 2, 1930

7 Claims. (Cl. 260—3)

This invention is based on the observation that products of technical value are obtained by condensing one or more ammonia derivatives of a thio-carbonic acid, for example thiourea, with an aldehyde, for example formaldehyde, in the presence of a halogen derivative of a polyhydric alcohol (which term is used herein to signify an alcohol having two or more —OH groups), or of a derivative, for example an ether, of such halogen derivative, or, instead, of such halogen derivative, another ester of a polyhydric alcohol, for example diacetin or the like; or by bringing together at least one halogen derivative of a polyhydric alcohol or a derivative, for example an ether, of such halogen derivative, or another ester of a polyhydric alcohol, with a condensation product of an ammonia derivative of a thio-carbonic acid, for example thiourea, and an aldehyde, for example formaldehyde, either during the formation of the condensation product or after it has already been formed.

In addition to an ammonia derivative of a thio-carbonic acid, for example thiourea, there may be used in the present process for the condensation with an aldehyde, for example formaldehyde, an ammonia derivative of carbonic acid, for example urea or dicyanodiamide.

In comparison with condensation products prepared in the absence of a halogen derivative of a polyhydric alcohol, but otherwise under the same conditions, the condensation products obtainable in accordance with the present invention have a considerably increased tendency to resinify. This resinification occurs in the present process, more uniformly and rapidly than in the case of a condensation process carried out in the absence of a halogen derivative of a polyhydric alcohol, and the final products of the present process associated with the conversion into the resinous or glassy state are as a rule more homogeneous, more flexible, stronger, more lustrous and harder than the final products of the corresponding phase of the hitherto known processes. These advantages are manifested, not only in the case of articles such as molded articles, plates or the like, but also in the case of thin films, such as thin membranes, varnish or other coatings, or the like. The effect of the halogen derivatives of polyhydric alcohols or their derivatives cannot be stated with certainty; it appears, however, that they take part in the chemical reaction whereby the condensation product is formed.

Among the aldehydes which may be used in accordance with the invention it may be stated that formaldehyde, polymers of formaldehyde (for example trioxymethylene, paraformaldehyde), and derivatives of formaldehyde, such as hexamethylene-tetramine and acrolein may be used.

The condensation may be carried out in the presence or absence of a basic condensing agent (for example ammonia, pyridine, a basic salt, an alkali metal hydroxide or the like), or in the presence of an acid condensing agent (for example a dilute inorganic acid, such as sulphuric acid, glycerine-phosphoric acid or glycerine-sulphuric acid, or an organic acid, such as tartaric acid or citric acid, or an acid salt), or also in presence of any of the known accelerators.

Furthermore, the condensation may be carried out in the presence of a phenol or a phenyl-urea or the like.

There may be incorporated with the products of the present invention, in any stage of their production, any of the softening agents or agents imparting plasticity or elasticity, which are known in the technology of artificial resins or in the literature, for example glycerine, glycol, cyclohexanol or the like. The products of the invention may also be worked up together with another colloid or colloids, such as a natural resin, rubber or the like.

The following examples illustrate the invention, the parts being by weight:—

*Example 1*.—100 parts of thiourea are mixed with 170 parts of a commercial solution of formaldehyde (of about 40 per cent. strength) and 100 parts of α-dichlorhydrin, and the mixture is heated on a water bath to 60° C. As soon as this temperature is attained, the heating is interrupted and the solution, which is completely clear, is cooled to 30° C. and allowed to stand at this temperature for 20-26 hours. A portion of the clear solution is spread on a glass plate and dried at 60° C. until it is no longer sticky and the film appears dry to the touch. The film thus obtained is clear, hard and similar to glass.

The remainder of the solution is concentrated under a reduced pressure at 40° C. until it is of a syrupy consistency; the clear syrup is then worked up on a glass plate into a film, or in moulds into plates or molded articles of any desired size, the glass plate or mould, together with the layer or content being maintained at 60° C. until hardening occurs.

*Example 2*.—The procedure is as in Example 1, with the exception that there are added to the mixture of thiourea, dichlorhydrin and formaldehyde at the commencement 12.5 parts of a solution of ammonia of 25 per cent. strength.

*Example 3.*—The procedure is as in Example 1 or 2, with the exception that the layer spread on the glass plate or the solution or syrup contained in the mould is hardened at 110° C., whereby the conversion into the resinous or glassy state is considerably accelerated.

*Example 4.*—The procedure is as in Example 1, or 2, or 3, with the exception that after the reaction mixture has attained a temperature of 60° C., it is not cooled immediately, but is maintained for two hours at 60° C., before it is cooled to 30° C.

*Example 5.*—The procedure is as in Example 1, or 2, or 3, or 4, with the exception that there are added to the solution or syrup, before its conversion into the resinous or glassy state, 34 per cent. of ethylene glycol, calculated on the content of dry material of the solution or syrup.

*Example 6.*—The procedure is as in Example 5, with the exception that there are added in addition to the ethylene glycol also 4 per cent. of a 50 per cent. solution of glycerine-phosphoric acid, calculated on the content of dry material of the solution or syrup.

*Example 7.*—The procedure is as in any of the preceding examples, with the exception that instead of 100 parts of $\alpha$-dichlorhydrin there are used 150–200 parts of $\alpha$-dichlorhydrin.

*Example 8.*—100 parts of thiourea and 79 parts of urea are mixed with 340 parts of a solution of formaldehyde of about 40 per cent. strength and 10 parts of $\alpha$-dichlorhydrin, and the mixture is heated on a water bath to 40° C. As soon as this temperature is attained the heating is interrupted and the clear solution is cooled to 30° C. and allowed to stand at this temperature for 20–26 hours. A portion of the clear solution is spread on a glass plate and dried at 60° C. until it is no longer sticky and the film appears dry to the touch. The film thus obtained is clear, and hard and similar to glass.

The remainder of the solution is concentrated under a reduced pressure at 40° C. until it is of a syrupy consistency; the clear syrup is then worked up on a glass plate into a film, or in moulds into plates or shaped articles of any desired size, the glass plate or mould, together with the layer or content being maintained at 60° C. until hardening occurs.

*Example 9.*—The procedure is as in Example 8, with the exception that there are added to the mixture of thiourea, urea, $\alpha$-dichlorhydrin and formaldehyde at the commencement 12.5 parts of a solution of ammonia of 25 per cent. strength.

*Example 10.*—The procedure is as in Example 8, or 9, with the exception that the layer spread on the glass plate or the solution or syrup contained in the mould is hardened at 110° C., whereby the conversion into the resinous or glassy state is considerably accelerated.

*Example 11.*—The procedure is as in Example 8, or 9, or 10, with the exception that there are added to the solution or syrup, before its conversion into the resinous or glassy state, 34 per cent. of ethylene glycol, calculated on the content of dry material of the solution or syrup.

*Example 12.*—The procedure is as in Example 11, with the exception that there are added in addition to the ethylene glycol also 4 per cent. of a 50 per cent. solution of glycerine-phosphoric acid, calculated on the content of dry material of the solution or syrup.

*Example 13.*—The procedure is as in any of the Examples 8–12, with the exception that instead of 100 parts of $\alpha$-dichlorhydrin there are used 150–200 parts of $\alpha$-dichlorhydrin.

In the foregoing examples there may be used instead of $\alpha$-dichlorhydrin an equimolecular quantity of another halogen derivative of a polyhydric alcohol, for example ethylene-chlorhydrin, $\beta$-dichlorhydrin, $\alpha$- and $\beta$-monochlorhydrin, chlorhydrin, mannitol-chlorhydrin, epidichlorhydrin, pinacone-chlorhydrin, mannitol-dichlorhydrin or the like, or a derivative for example an ether, of a halogen derivative of a polyhydric alcohol, such as $\alpha$-mono chlorhydrin amyl ether (Reboul: Annales de Chimie et de Physique, 3rd series, Vol. LX) or $\alpha$-monochlorohydrin ethyl ether (ibidem) or $\alpha$-monochlorohydrin phenyl ether (Emil Fischer: Berichte der deutschen chemischen Gesellschaft, 1908), or another ester of a polyhydric alcohol, for example diacetin or the like.

Instead of chlorine derivatives there may also be used bromine or iodine derivatives. As used in the claims, the term "an urea body" signifies thiourea or its derivatives, alone or mixed with urea or dicyanodiamide.

What I claim is:—

1. The process of manufacturing condensation products which comprises chemically combining a mixture consisting of a substance selected from the group consisting of urea, thiourea and dicyanodiamide, an aldehyde and a halogen derivative of a polyhydric alcohol.

2. The process of manufacturing condensation products which comprises chemically combining a mixture consisting of a substance selected from the group consisting of urea, thiourea and dicyanodiamide, formaldehyde and a halogen derivative of a polyhydric alcohol.

3. The process of manufacturing condensation products which comprises chemically combining a mixture consisting of thiourea, an aldehyde and dichlorhydrin.

4. A resinous reaction product constituted solely of a substance selected from the group consisting of urea, thiourea and dicyanodiamide, an aldehyde and a halogen derivative of a polyhydric alcohol.

5. A resinous reaction product constituted solely of a substance selected from the group consisting of urea, thiourea and dicyanodiamide, formaldehyde and a halogen derivative of a polyhydric alcohol.

6. A resinous reaction product constituted solely of a substance selected from the group consisting of urea, thiourea and dicyanodiamide, a polymer of formaldehyde and a halogen derivative of a polyhydric alcohol.

7. A resinous reaction product constituted solely of a substance selected from the group consisting of urea, thiourea and dicyanodiamide, an aldehyde and dichlorhydrin.

LEON LILIENFELD.